Nov. 15, 1938.  A. KUHNS  2,136,446
DRIVING ASSEMBLY
Filed June 4, 1937
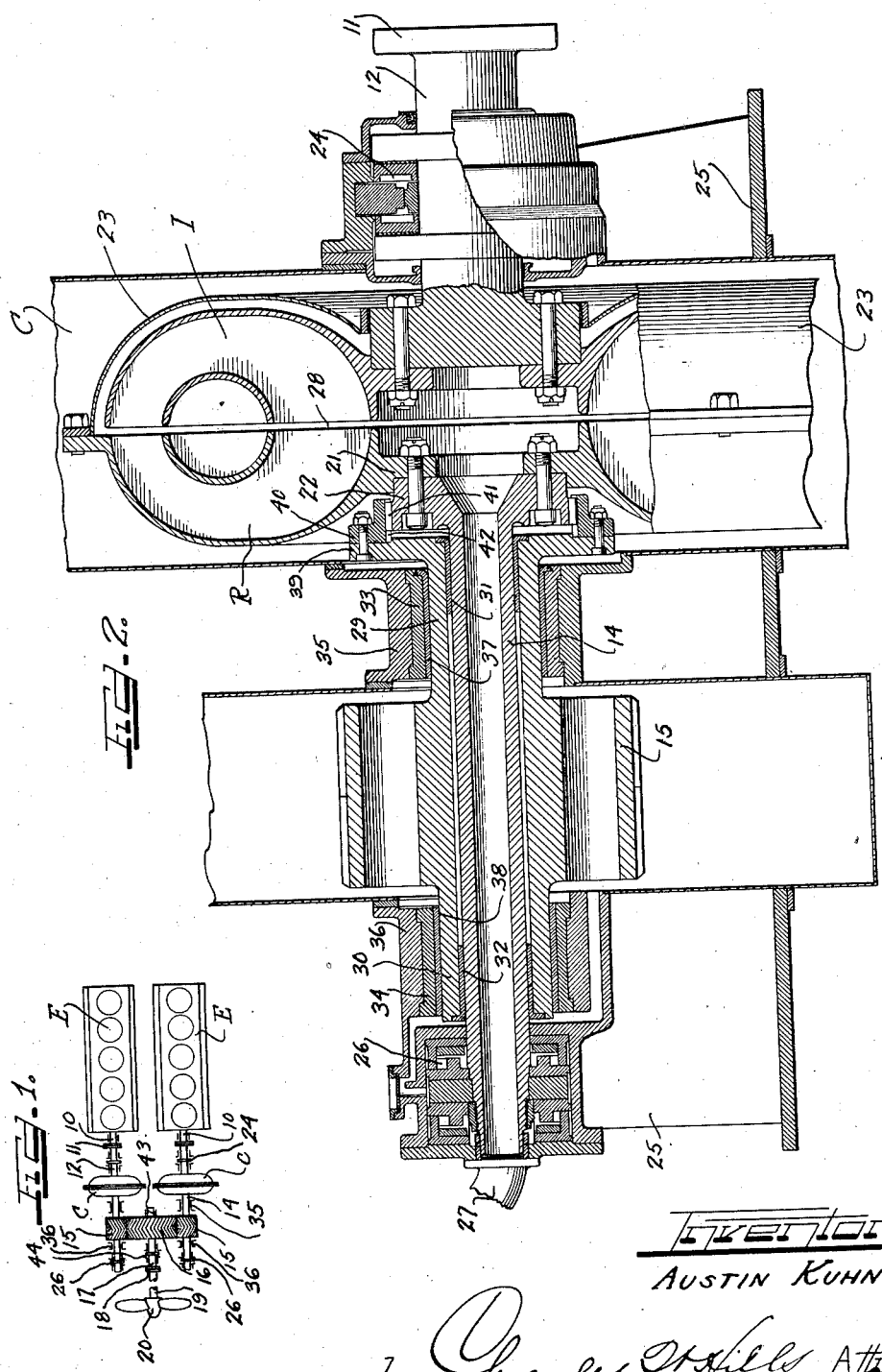
Inventor
AUSTIN KUHNS.
by Charles H. Hills Attys.

Patented Nov. 15, 1938

2,136,446

UNITED STATES PATENT OFFICE 2,136,446

DRIVING ASSEMBLY

Austin Kuhns, Buffalo, N. Y., assignor to Farrel-Birmingham Company, Incorporated, Buffalo, N. Y., a corporation of Connecticut Application June 4, 1937, Serial No. 146,447

4 Claims. (Cl. 74—189.5)

This invention relates to improved driving assembly adapted particularly for use in driving systems in which a number of driving units are connected through clutch means and gear pinions with a gear on the shaft of an element to be driven, as for example in marine propulsion where a number of driving units such as Diesel engines are each connected through hydraulic clutch means with a driving pinion meshing with a driving gear on the shaft of the propeller.

In the type of propulsion systems referred to, double helical or herringbone gearing has been found very desirable on account of the efficient and noiseless operation. Although the propeller shaft is provided with thrust bearings, there may be more or less axial shift or oscillation of the shaft during service owing to variations in resistance to the propeller, such axial displacement being more pronounced when the direction of rotation of the propeller is changed. For efficient operation of the herringbone gearing, relative axial displacement of the herringbone gear and pinions must be avoided to prevent undue friction between teeth and grinding and wear, and means must therefore be provided to prevent any such relative axial displacement of the gear members by the axial displacement of the propeller shaft. It is therefore the principal object of this invention to provide simple means for preventing propeller shaft axial displacement from disturbing the proper and efficient gearing relationship of the herringbone gearing elements, and this is preferably accomplished by spline connection between the gear pinions and their driving elements so that these pinions may readily and freely shift axially to follow any axial movement of the propeller shaft gear with which the pinions are in mesh.

The invention is incorporated in the structure disclosed on the drawing, in which drawing:

Figure 1 is a more or less diagrammatic plan view of a marine propulsion system to which my invention is applied; and Figure 2 is an enlarged vertical diametral section through one of the driving unit trains.

Referring to Figure 1, the power units E, which may be Diesel engines, have their shafts 10 connected by suitable couplings 11 with the impeller shaft 12 of the hydraulic clutch structures C whose runner shafts 14 have driving connection with gear pinions 15 which mesh with the gear 16 on a shaft 17 connected by coupling 18 with the propeller shaft 19 whose outer end supports a propeller 20. The pinions and gear are of the double helical or herringbone type.

The hydraulic coupling or clutch shown is of a well known type whose principle of operation is disclosed in patents such as Fottinger No. 1,199,359, issued September 26, 1916. It comprises the impeller member I and the runner member R. The impeller member is bolted or otherwise secured to the inner end of the drive shaft 12 which has its outer end coupled to the shaft of a driving engine E as shown in Figure 1. The runner element R is secured by its hub 21 to the hub 22 at the inner end of the shaft 14. The cover structure 23 for retaining the hydraulic fluid within the impeller and runner element is secured to the runner element along the periphery thereof and extends around the impeller element I to surround the inner end of the drive shaft 12. The driving shaft 12 is journalled in a suitable thrust bearing structure 24 supported by the framework or base structure 25. At its outer end the runner shaft 14 is supported in a suitable thrust bearing structure 26 supported on the framework 25, the shaft 14 being hollow and having an inlet pipe 27 connected with its outer end for the charging of hydraulic fluid to the hydraulic clutch structure C. The thrust bearing structures 24 and 26 take up the thrusts caused by the pressure of the fluid against the opposed impeller and rotor elements I and R and maintain the proper gap 28 between the elements.

The hub of the pinion 15 is tubular and has the bearing extensions 29 and 30, the runner shaft 14 extending concentrically through the tubular hub of the pinion, the bearing extensions 29 and 30 having at their ends bearing bushings 31 and 32 for the shaft 14. The extensions 29 and 30 are journalled in bushings 33 and 34 within the bearing housings 35 and 36 which form part of the supporting framework 25, bearing linings 37 and 38 being provided for the bushings to reduce friction.

The bearing extension 29 has at its inner end the radially extending flange 39 against the inner side of which is secured a ring 40 which surrounds the hub 22 on the inner end of the runner shaft 14 and has spline connection therewith. As shown, the hub 22 has splines or teeth 41 thereon engaging in the transverse channels 42 on the inner side of the ring 40. The bearing extensions 29 and 30 for the pinion hub are longer than bearings 35 and 36 so that the pinion structure may shift axially in the bearings, the spline connection between the ring 40 and the head of the shaft 14 permitting such axial shift of the pinion structure but maintaining coupling connection between the pinion structure and the runner structure R so that the runner shaft 14 is always driven by the runner and the rotation of the shaft is communicated through the spline connection to the pinion structure.

Referring to Figure 1, the supporting shaft 17 for the propeller gear 16 is supported in suitable bearings 43 and 44, the outer bearing 44 being usually a thrust bearing tending to hold the propeller shaft against axial shift. However, there may be slight axial shift of the propeller shaft as the propeller encounters different resistances, and the shift will be more pronounced when the direction of rotation of the propeller is changed. Any axial shift of the propeller shaft will be communicated to the gear 16, and if the gear pinions which mesh with the gear 16 were not free to move axially with the gear 16, the teeth of the meshed gears would bind and cause considerable friction and noise, if the gearing is of the double helical or herringbone type. However, by having the pinion structures freely axially shiftable as has been described, the pinion structures may readily and freely follow any axial shift or displacement of the propeller shaft and gear so that proper meshing of the gear elements will be maintained.

The pressure within the hydraulic clutch may vary under different conditions of operation, and there may be slight movement or oscillation of the runner structure and its shaft 14. On account of the spline connection between the pinion structure and the runner structure, such oscillation or axial displacement of the runner structure will not be communicated to the pinion structure so that the proper meshing engagement between the pinion structures and the propeller gear will not be interfered with.

I thus provide simple and efficient arrangement in driving systems of the class referred to for adapting such systems for the efficient use of gearing of the double helical or herringbone type. I do not, however, desire to be limited to the exact construction and arrangement shown and described, as changes and modifications may be made without departing from the scope and spirit of the invention.

I claim as follows:

1. In a driving assembly, a hydraulic clutch comprising an impeller element and a runner element, a shaft supporting the impeller element and adapted for connection with a power source, a shaft supporting the runner element, thrust bearings preventing axial displacement of said shafts, a driving pinion of the herringbone type journalled concentric with and on said runner element supporting shaft and having spline connection with said runner element, and a driven gear of the herringbone type meshed by said pinion, said spline connection permitting axial movement of said pinion relative to said runner element to follow any axial displacement of said driven gear.

2. In a driving assembly, a hydraulic clutch comprising an impeller element and a runner element, a supporting shaft for the impeller element adapted for connection with a power source, a supporting shaft structure for said runner element axially aligned with said impeller element supporting shaft, thrust bearings for holding said shaft structures against axial displacement, a driving pinion of the herringbone type, a tubular supporting shaft structure for said pinion surrounding and journalling the shaft structure for said runner element, a driven gear of the herringbone type meshed by said pinion, and a driving connection between said runner shaft structure and said pinion shaft structure arranged to permit axial movement of said pinion to freely follow any axial displacement of said driven gear whereby proper mesh between said pinion and gear will be maintained.

3. In a propulsion system of the class described, a propeller shaft and a gear thereon, driving assembly units for driving said gear, each unit assembly comprising a hydraulic coupling having an impeller element and a runner element and a gear pinion driven by the runner element and meshing with said gear, a shaft structure supporting the impeller element and adapted for connection with a driving engine, a shaft structure for the runner element, thrust bearings for said shaft structures for preventing axial relative displacement thereof, intermediate bearing structures surrounding the runner element shaft structure, a hollow shaft structure for the driving pinion journalled in said intermediate bearings and the runner shaft structure extending through and journalled in said pinion shaft structure, and a drive connection between said runner shaft structure and the pinion shaft structure arranged to permit axial shift of the pinion and its shaft structure whereby the pinions of said driving unit assemblies may follow any axial displacement of the propeller gear to maintain proper meshing engagement therewith.

4. In a driving assembly of the class described, a hydraulic clutch comprising an impeller element and a runner element in axial alignment therewith, means preventing axial displacement of said elements, said impeller element being adapted for connection with a power unit, a supporting shaft for the runner element, a transmission shaft surrounding and journaling said runner supporting shaft and a drive pinion secured on said transmission shaft having diagonally extending teeth, a gear meshed by said driving pinion, and a spline driving connection between said shafts arranged to permit axial shift of the transmission shaft on said runner supporting shaft whereby said pinion may follow any axial shift of said gear and maintain proper mesh with the teeth thereof.

AUSTIN KUHNS.